United States Patent
Nakashima

(10) Patent No.: US 9,030,177 B2
(45) Date of Patent: May 12, 2015

(54) SWITCHED-MODE POWER SUPPLY HAVING AN ADAPTIVE ON-TIME FUNCTION AND CONTROLLING OUTPUT WITH A RIPPLE CONTROL METHOD

(75) Inventor: Heisuke Nakashima, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 13/458,365

(22) Filed: Apr. 27, 2012

(65) Prior Publication Data
US 2012/0274301 A1 Nov. 1, 2012

(30) Foreign Application Priority Data

Apr. 28, 2011 (JP) .................................. 2011-100911

(51) Int. Cl.
G05F 1/00 (2006.01)
H02M 3/158 (2006.01)
H02M 1/14 (2006.01)
H02M 1/00 (2006.01)

(52) U.S. Cl.
CPC ............... *H02M 3/1588* (2013.01); *H02M 1/14* (2013.01); *H02M 2001/0022* (2013.01); *Y02B 70/1466* (2013.01)

(58) Field of Classification Search
CPC ....... H02M 3/06; H02M 3/155; H02M 3/156; H02M 3/158; H02M 3/1588; H02M 2001/0022; H02M 2001/0025; H02M 2001/0009; H02M 1/14; H02M 1/143; H02M 1/146; H02M 1/15; Y02B 70/1466
USPC ......... 323/269–275, 282–288, 321, 351, 901, 323/222–226, 205–211, 280; 363/21.01, 363/89, 90; 315/186
See application file for complete search history.

(56) References Cited

U.S. PATENT DOCUMENTS

| | | | | |
|---|---|---|---|---|
| 4,937,722 A | * | 6/1990 | Deierlein | 363/49 |
| 5,490,055 A | * | 2/1996 | Boylan et al. | 363/41 |
| 6,147,478 A | * | 11/2000 | Skelton et al. | 323/288 |
| 6,154,375 A | * | 11/2000 | Majid et al. | 363/16 |
| 7,482,793 B2 | * | 1/2009 | Stoichita | 323/282 |

(Continued)

FOREIGN PATENT DOCUMENTS

JP 4056780 B2 12/2007

OTHER PUBLICATIONS

Japanese Office Action dated Dec. 16, 2014, issued in counterpart Japanese Application No. 2011-100911.

*Primary Examiner* — Timothy J Dole
*Assistant Examiner* — Carlos Rivera-Perez
(74) *Attorney, Agent, or Firm* — Holtz, Holtz, Goodman & Chick PC

(57) ABSTRACT

A ripple-control switched-mode power supply includes a control circuit to switch on/off a drive switching element. The control circuit includes a simulated voltage generation circuit that smoothes a voltage at a node connecting the drive switching element and an inductor and that generates a simulated voltage corresponding to an output voltage; a timer that measures a time corresponding to an input voltage and the simulated voltage; a voltage comparison circuit that compares a feedback voltage and a predetermined voltage; and a control pulse generation circuit that generates a control pulse having a pulse width corresponding to the time based on outputs from the timer and the voltage comparison circuit. The control circuit varies the pulse width of the control pulse in accordance with a variation in the input voltage to maintain a constant switching cycle.

11 Claims, 6 Drawing Sheets

(56) References Cited

U.S. PATENT DOCUMENTS

2005/0001602 A1* 1/2005 Umminger et al. ........... 323/282
2008/0088292 A1* 4/2008 Stoichita et al. .............. 323/285
2008/0191674 A1* 8/2008 Cheng et al. .................. 323/282
2010/0134085 A1* 6/2010 Nishida ......................... 323/285
2010/0270995 A1* 10/2010 Laur et al. ..................... 323/285

* cited by examiner

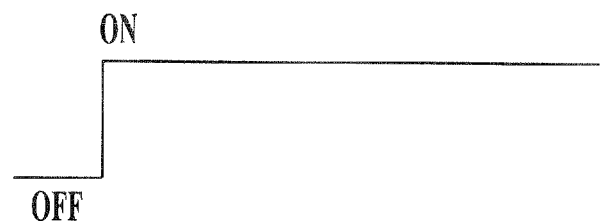
FIG.3A  Enable
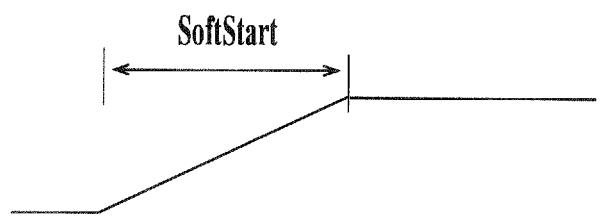
FIG.3B  Vout
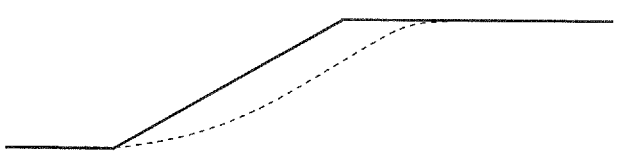
FIG.3C  Vemu

SWITCHED-MODE POWER SUPPLY HAVING AN ADAPTIVE ON-TIME FUNCTION AND CONTROLLING OUTPUT WITH A RIPPLE CONTROL METHOD

BACKGROUND OF THE INVENTION

1. Field of the Invention

The present invention relates to a switching regulator DC-DC converter that converts DC voltage and, in particular, to a switched-mode power supply that has an adaptive on-time function and that controls output in a ripple control method.

2. Description of Related Art

A switching regulator DC-DC converter is a circuit that converts a DC input voltage and outputs a DC voltage different from the input voltage. Such a DC-DC converter has a drive switching element, a rectifying element, and a control circuit. The drive switching element applies a DC voltage supplied from a DC power source, such as a battery, to an inductor (coil) to store energy in the coil through which current flows. The rectifying element rectifies the current in the coil during energy release when the drive switching element is off. The control circuit switches on and off the drive switching element.

Conventional control methods of such a switching regulator DC-DC converter include a voltage control method in which an output voltage is fed back for modulation control of the pulse width or frequency of a drive pulse of the switching element, a current control method, which is an improved voltage control method, and a ripple control method. A speed of response to a sudden change in load is low in the voltage control method and the current control method.

In contrast, the ripple control method, which monitors an output voltage and detects a voltage below (above) a set threshold to switch on or off the switching element, is free from delay attributable to frequency characteristics of an error amplifier, thus achieving a high load response speed compared with the voltage control method and the current control method. In order to maintain the switching frequency constant while the load does not change, the ripple control method includes an adaptive on-time function that feeds forward an input voltage and an output voltage to determine the time of a timer specifying an ON time of the switching element (Japanese Patent No. 4056780).

The DC-DC converter of the ripple control method having the adaptive on-time function, however, should be provided with a terminal to apply an output voltage to the control circuit for monitoring the output voltage. Accordingly, the number of external terminals (pins) is increased in case of using an IC (semiconductor integrated circuit) for the switching control circuit, thus leading to a cost increase. Furthermore, the adaptive on-time function cannot be mounted in some cases due to limitation of the number of external terminals of the IC.

SUMMARY OF THE INVENTION

In view of such circumstances, the present invention provides a technology to mount an adaptive on-time function on a control circuit (IC) without increasing the number of external terminals in a switched-mode power supply of a ripple control method.

According to an aspect of the present invention, there is provided a switched-mode power supply that outputs a voltage different from an input voltage, the switched-mode power supply including: an inductor connected between a voltage input terminal to which a DC voltage is input and an output terminal to which a load is connected; a drive switching element that causes a current to intermittently flow through the inductor; and a control circuit that is provided on a semiconductor chip as a semiconductor integrated circuit and that generates a drive pulse in response to the voltage input to the voltage input terminal and a feedback voltage from the output terminal to switch on/off the drive switching element, wherein the control circuit includes: a simulated voltage generation circuit that smoothes a voltage at a node connecting the drive switching element and the inductor and that generates and outputs a simulated voltage corresponding to the output voltage; a timer that measures a time corresponding to the input voltage and the simulated voltage; a voltage comparison circuit that compares the feedback voltage and a predetermined voltage; and a control pulse generation circuit that generates a control pulse having a pulse width corresponding to the time measured by the timer based on output from the timer and output from the voltage comparison circuit, and wherein the control circuit varies the pulse width of the control pulse in accordance with a variation in the input voltage and the simulated voltage and outputs the drive pulse corresponding to the control pulse to maintain a constant switching cycle.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 3A to 3C illustrate a timing chart of a change in output voltage and simulated voltage at start-up of a switching control circuit included in the DC-DC converter according to the embodiment;

DESCRIPTION OF THE PREFERRED EMBODIMENTS

Preferred embodiments of the present invention are described with reference to the attached drawings.

Figure 1:
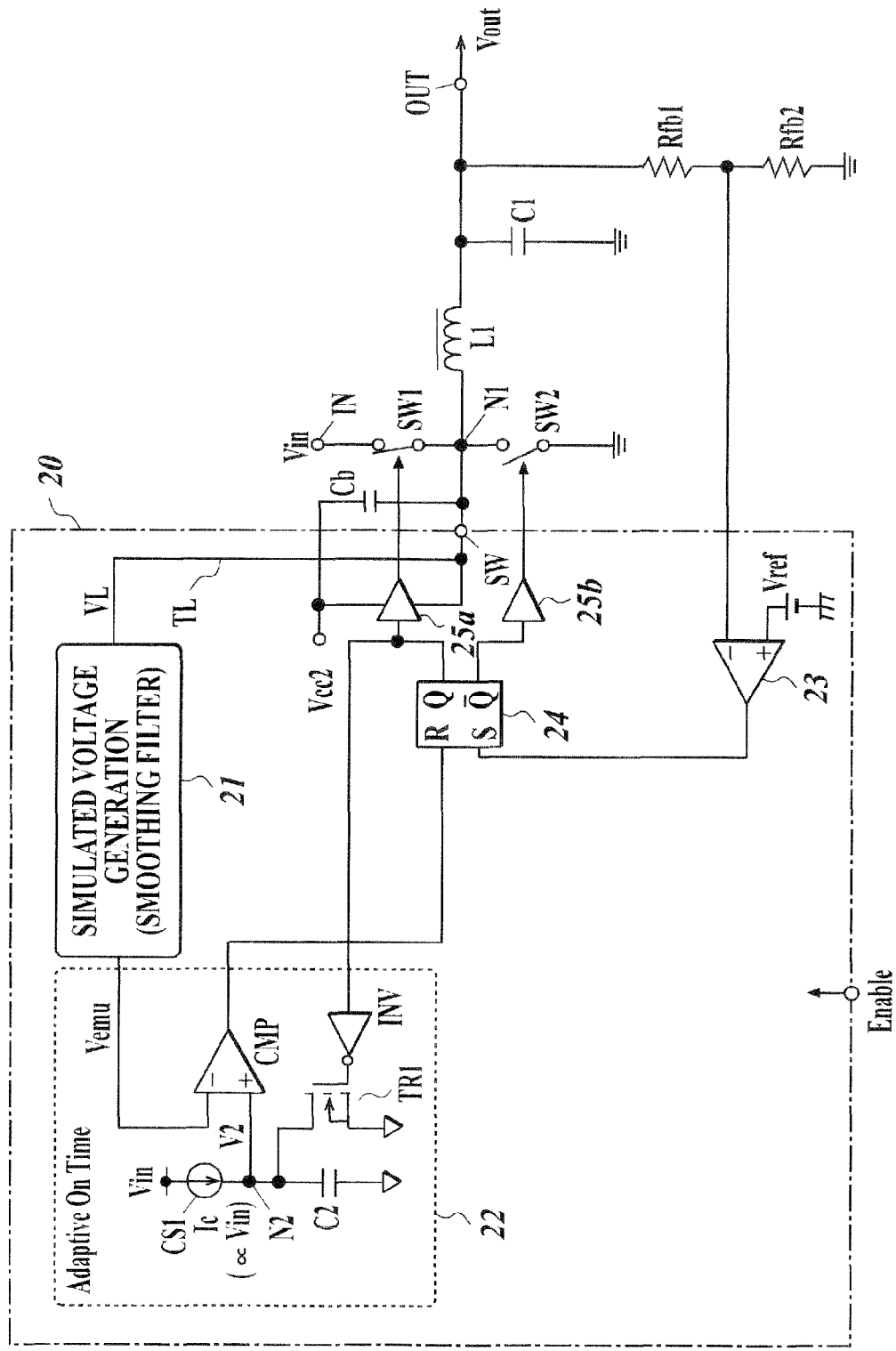
FIG. 1 is a circuit configuration diagram of a switching regulator DC-DC converter according to an embodiment of the present invention.

FIG. 1 illustrates a switching regulator DC-DC converter according to an embodiment of the present invention.

The DC-DC converter of the embodiment has a coil L1 as an inductor, a drive switching element SW1 on a high side, and a rectifying switching element SW2 on a low side. The drive switching element SW1 is connected between a voltage input terminal IN to which a DC input voltage $V_{in}$ is applied and a first terminal of the coil L1, and allows a drive current to flow through the coil L1. The rectifying switching element SW2 is connected between the first terminal of the coil L1 and a ground point. The drive switching element SW1 and the rectifying switching element SW2 may be composed, for example, of an N-channel MOSFET (insulated gate field effect transistor).

The DC-DC converter of the embodiment also has a switching control circuit 20 that switches on or off the switching elements SW1 and SW2 and a smoothing capacitor C1 connected between a second terminal (output terminal OUT) of the coil L1 and a ground point.

Of the circuit and elements included in the DC-DC converter, the switching control circuit 20 may be provided on a semiconductor chip of a semiconductor integrated circuit (power supply control IC), and the switching elements SW1 and SW2, the coil L1, and the capacitor C1 may be provided as external elements connected to an external terminal of the IC.

In the DC-DC converter of the embodiment, drive pulses GP1 and GP2 that complementarily switch on and off the switching elements SW1 and SW2 are generated by the switching control circuit 20. Normally, the drive switching element SW1 is switched on, and then the DC input voltage $V_{in}$ is applied to the coil L1 and a current flows to the output terminal OUT to charge the smoothing capacitor C1.

Alternatively, the drive switching element SW1 is switched off, and then the rectifying switching element SW2 is switched on and a current flows to the coil L1 through the rectifying switching element SW2 that is turned on. The pulse width or frequency of the drive pulse GP1 input to a control terminal (gate terminal) of the switching element SW1 is controlled in association with an output ripple to generate a predetermined DC output voltage $V_{out}$ decreased from the DC input voltage $V_{in}$.

In the switching control circuit 20 of the embodiment, a node N1 connecting a source terminal of the drive switching element SW1 and the first terminal of the coil L1 is formed as an external terminal SW of an IC. The IC has a simulated voltage generation circuit 21 which is connected to the node N1 and is composed of a low pass filter that smoothes a voltage VL at the node and generates a voltage $V_{emu}$ corresponding to the output voltage in a simulated manner.

The switching control circuit 20 of the embodiment has an adaptive on-time circuit 22 (timer), a comparator 23 (voltage comparison circuit), an RS flip-flop 24 (control pulse generation circuit), and driver circuits 25a and 25b. The adaptive on-time circuit 22 receives the voltage $V_{emu}$ generated by the simulated voltage generation circuit 21. The comparator 23 receives a feedback voltage $V_{FB}$ and a predetermined reference voltage $V_{ref}$, the feedback voltage $V_{FB}$ being provided by dividing the output voltage $V_{out}$ at series resistors Rfb1 and Rfb2. The RS flip-flop 24 has a set terminal that receives output from the comparator 23 and a reset terminal that receives output from the adaptive on-time circuit 22, and serves as a control pulse generation circuit that generates a control pulse to switch on or off the switching elements SW1 and SW2. The driver circuits 25a and 25b receive outputs Q and /Q, respectively, of the flip-flop 24 and generate and output drive pulses GP1 and GP2, respectively, that switch on or off the switching elements SW1 and SW2.

In the embodiment, the switching element SW1 is an N-channel MOS transistor. Thus, a boost circuit (external capacitor Cb) is connected between the node N1 and a power supply voltage terminal of the driver circuit 25a, the boost circuit boosting the power supply voltage of the driver circuit 25a with reference to the voltage at the node N1 (source of the switching element SW1) to increase a high-level voltage of the drive pulse GP1 and decrease on-resistance of the switching element SW1.

In order to provide, in the chip, this driver circuit having the source voltage of the switching element SW1 as a reference voltage, the switching control circuit 20 of the embodiment has an external terminal SW to which the node N1 is connected, even if the switching element SW1 is an external element. Thus, a wiring TL in FIG. 1 can be provided on the chip to transmit the voltage VL at the node N1 to the simulated voltage generation circuit 21, eliminating necessity to provide a separate external terminal to input the voltage VL.

The adaptive on-time circuit 22 has a constant current source CS1, a capacitor C2 connected in series to the constant current source CS1, a MOS transistor TR1 for discharge, and a comparator CMP. The MOS transistor TR1 is connected in parallel to the capacitor C2 and is switched on or off by a voltage of output Q of the flip-flop 24 inverted by an inverter INV. The comparator CMP has a non-inverting input terminal that receives a voltage V2 at a node N2 connecting the constant current source CS1 and the capacitor C2, and an inverting input terminal that receives the voltage $V_{emu}$ generated by the simulated voltage generation circuit 21. The constant current source CS1 of the adaptive on-time circuit 22 in the embodiment supplies a current Ic ($V_{in}$) proportionate to the input voltage $V_{in}$.

In a conventional DC-DC converter of a ripple control method having an adaptive on-time function, an output voltage $V_{out}$ is directly input to an adaptive on-time circuit. In contrast, in the switching control circuit 20 of the embodiment, the voltage $V_{emu}$ is input to the adaptive on-time circuit 22, the voltage $V_{emu}$ being generated by the simulated voltage generation circuit 21 to which the voltage VL at the node N1 connected to the coil L1 is input.

In the DC-DC converter in FIG. 1, the voltage at the node N1 connected to the coil L1 is a voltage that varies in association with switching on or off of the switching element SW1. Thus, the output voltage $V_{out}$ is deemed as a voltage provided by smoothing the voltage at the node N1 with a filter composed of the coil L1 and the smoothing capacitor C1. In the embodiment, the voltage $V_{emu}$ which corresponds to the output voltage $V_{out}$, is generated in a simulated manner by smoothing the voltage VL at the node N1 in the simulated voltage generation circuit 21 including a filter. Then, the voltage $V_{emu}$ is input to the adaptive on-time circuit 22 so as to achieve a function equivalent to the conventional adaptive on-time function having $V_{out}$ as input.

Figure 2A:
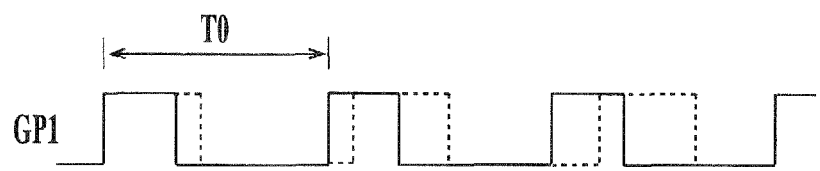
FIGS. 2A and 2B illustrate a timing chart of a change in a drive pulse of a switching element and a change in a voltage of an internal node of an adaptive on-time circuit in the DC-DC converter according to the embodiment.
Figure 2B:
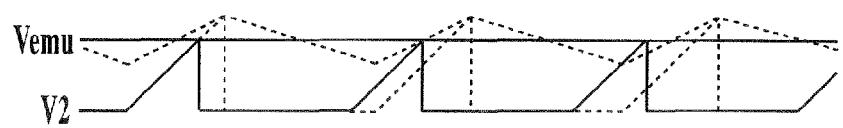

Operations of the DC-DC converter of the embodiment having the switching control circuit 20 as illustrated in FIG. 1 are described below with reference to the timing chart in FIGS. 2A and 2B. To facilitate understanding, descriptions are provided in cases where the input voltage $V_{in}$ is constant while the load varies and where the load is constant while the input voltage $V_{in}$ varies. Practically, variations thereof may occur concurrently, where operations described below proceed concurrently.

A case is described where the input voltage $V_{in}$ is constant while the load varies from heavy to light. In this case, the current Ic of the constant current source CS1 of the adaptive on-time circuit 22 is constant since the input voltage $V_{in}$ is constant. Thus, a time until the voltage of the internal node N2 of the adaptive on-time circuit 22 reaches the simulated voltage $V_{emu}$ is almost constant. When the voltage at the node N2 reaches the simulated voltage $V_{emu}$ the switching element SW1 is switched off and the output voltage $V_{out}$ slowly decreases due to light load.

Specifically, if the load is decreased, a cycle T0 of the drive pulse GP1 is extended. As the cycle T0 of the drive pulse GP1 is extended, the duty ratio is decreased, and thus the current flowing to the coil L1 through the switching element SW1 decreases. Subsequently, the load is stabilized, and then the duty ratio and frequency of the drive pulse GP1 are maintained constant. The ripple control method, which does not employ an error amplifier used in a voltage control method or a current control method, allows a quick response as described above.

If the input voltage $V_{in}$ is constant while the load varies from light to heavy, the output voltage $V_{out}$ decreases relatively fast, in contrast to the case above. Thus, timing is advanced when the drive pulse GP1 changes to a high level and the switching element SW1 is switched on. Specifically, if the load is increased, the cycle T0 of the drive pulse GP1 is shortened. As the cycle T0 of the drive pulse GP1 is shortened, the duty ratio is increased, and thus the current flowing to the coil L1 through the switching element SW1 increases. Subsequently, the load is stabilized, and then the frequency is maintained constant.

Operations of the adaptive on-time circuit 22 are described below in cases where the input voltage $V_{in}$ is low and high at a constant load.

If $V_{in}$ is low, the current flowing from the input terminal IN to the coil L1 is small during a period when the switching element SW1 is on, and thus the output voltage increases slowly. With the input voltage $V_{in}$ low, however, the current Ic of the constant current source CS1 of the adaptive on-time circuit 22 is small, and thus the time is extended until the voltage at the node N2 in the timer circuit reaches $V_{emu}$, delaying timing when the output from the flip-flop 24 falls to a low level. Accordingly, the time when the switching element SW1 is on is extended.

If $V_{in}$ is high, the current flowing from the input terminal IN to the coil L1 increases, and thus the output voltage increases quickly. With the increased current Ic of the constant current source CS1 of the adaptive on-time circuit 22, however, the time is shortened until the voltage at the node N2 in the timer circuit reaches $V_{emu}$, advancing the timing when the output from the flip-flop 24 falls to a low level. Thus, the time is short when the switching element SW1 is on.

In the adaptive on-time circuit 22, the product of the current and time is controlled to be substantially constant regardless of the level of the input voltage $V_{in}$. With no variation in load, the timing does not change when the output from the comparator 23 varies, specifically, the timing does not change when the switching element SW1 is switched on. Thus, if the input voltage $V_{in}$ varies at a constant load, the duty ratio of the drive pulse of the switching element SW1 varies and the switching frequency is maintained constant.

The simulated voltage generation circuit 21 determines an optimum time constant as follows: The simulated voltage generation circuit (filter) 21 smoothes the voltage at the node N1 that varies in a rectangular wave shape. The smoothing function depends on a time constant. If the time constant is small and the smoothing function is weak, the simulated voltage $V_{emu}$ varies as indicated with a broken line in FIG. 2B. Then, the timing when the output from the comparator CMP changes to a high level is delayed, and thus the timing when the drive pulse GP1 that switches on or off the switching element SW1 falls to a low level, specifically the timing when the switching element SW1 is switched off, is delayed as indicated with a broken line in FIG. 2A.

Accordingly, the output voltage $V_{out}$ increases, and thus the switching frequency decreases in order to offset the increase. To prevent the switching frequency from varying, it is desirable that the simulated voltage $V_{emu}$ be as smooth as possible, specifically, the time constant of the filter be as large as possible. The present invention has found it desirable that the time constant of the filter be set large such that the amplitude of the voltage that passes through the filter is approximately 1% or less, i.e., 1/100 or less, of the amplitude of the voltage (triangle wave) at the node N2.

The switching regulator DC-DC converter is provided with a soft-start circuit (not shown in FIG. 1) to prevent a large current from suddenly flowing into a load at start-up. When an enable signal (or power voltage) rises as illustrated in FIG. 3A, the soft-start circuit controls the output voltage $V_{out}$ to rise slowly as illustrated in FIG. 3B.

With a large time constant of the simulated voltage generation circuit 21, the simulated voltage $V_{emu}$ rises slower than the output voltage $V_{out}$ that raised by the soft-start circuit. Then, the adaptive on-time circuit 22 cannot function normally at start-up in some cases. Therefore, it is desirable that the time constant T of the simulated voltage generation circuit 21 in the embodiment be set less than the time constant of the soft-start circuit. Thus, the simulated voltage $V_{emu}$ can follow the rising speed of the output voltage $V_{out}$ as indicated with a solid line in FIG. 3C. A broken line in FIG. 3C illustrates an unfavorable example in which the simulated voltage $V_{emu}$ cannot follow the rising speed of the output voltage $V_{out}$ since the time constant T of the simulated voltage generation circuit 21 is greater than the time constant of the soft-start circuit.

Accordingly, in the case of a switching frequency of 600 kHz and a soft-start time of 1 ms, the optimal time constant of the simulated voltage generation circuit 21 that serves as a filter is 10 μs to 100 μs.

Figure 4A:
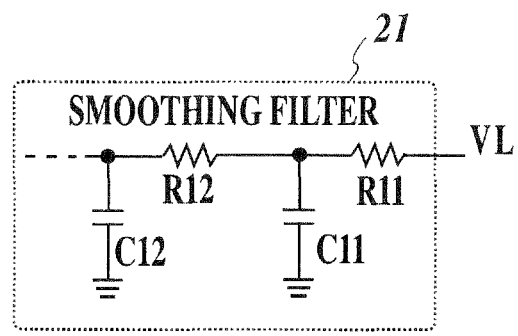
FIGS. 4A and 4B are each a circuit configuration diagram illustrating a specific example of a simulated voltage generation circuit in the DC-DC converter according to the embodiment.
Figure 4B:
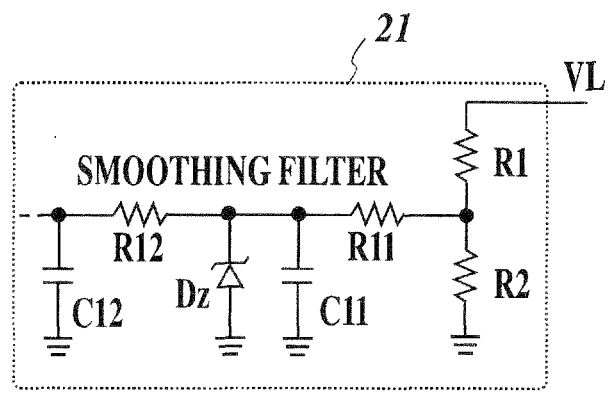

FIGS. 4A and 4B illustrate specific examples of the simulated voltage generation circuit 21. In FIG. 4A, low pass filters each composed of a resistor and a capacitor are connected at multiple positions, whereas, in FIG. 4B, the voltage VL at the node N1, which is divided by series resistors R1 and R2, is smoothed by a low pass filter composed of a resistor and a capacitor.

The simulated voltage generation circuit 21 illustrated in FIGS. 4A and 4B has a low pass filter FLT2 composed of a resistor R12 and a capacitor C12 connected after a low pass filter FLT1 composed of a resistor R11 and a capacitor C11. The number of low pass filters is not limited to two, and may be three or more, or may be one.

The simulated voltage generation circuit 21 having low pass filters connected at multiple positions as shown in FIGS. 4A and 4B has a large number of elements to smooth the voltage through the filters of the respective positions sequentially in stages; however, it can reduce the size of each capacitor compared to a circuit that includes one low pass filter. In the case where voltage-dividing circuits (R1 and R2) are provided as in the simulated voltage generation circuit 21 of FIG. 4B, the voltage applied to each capacitor is lower than that in FIG. 4A, thus allowing use of an element having a low withstanding voltage.

The lower the withstanding voltage of a capacitor estimated to be used in the present invention is, the higher the capacity value per unit area of the capacitor is. That is, when the capacity value is the same, the element size is reduced in the present invention. Thus, the simulated voltage generation circuit 21 in FIG. 4B can be formed in a smaller area than that in FIG. 4A. Specifically, in the circuit in FIG. 4B, if the input voltage $V_{in}$ is 12V, the output voltage $V_{out}$ is 5V, the switching frequency is 600 kHz, and the resistance ratio of the resistors R1 to R2 is 1:1, a desirable property can be achieved at a resistance value of each filter of 1 MΩ and a capacity value of approximately 10 pF.

The circuit in FIG. 4B uses an element with a low withstanding voltage, which may be damaged if a voltage higher than estimated is input. In order to prevent such damage, a zener diode Dz for withstanding voltage is connected in parallel to the capacitor C11 of the first low pass filter.

It might be thought that the feedback voltage $V_{FB}$ could be input to the adaptive on-time circuit 22 without providing the simulated voltage generation circuit for smoothing the voltage VL at the node N1 as in the DC-DC converter of FIG. 1.

The DC-DC converter, however, controls the feedback voltage $V_{FB}$ to be equal to the reference voltage $V_{ref}$. Thus, a voltage similar to $V_{ref}$ is constantly generated as $V_{FB}$ regardless of the output voltage $V_{out}$.

At a reference voltage $V_{ref}$ of 1V, for instance, to generate an output voltage $V_{out}$ of 5V, the ratio of the resistor Rfb1 to the resistor Rfb2 is set to 4:1, and then the feedback voltage $V_{FB}$ is controlled to be equal to the reference voltage $V_{ref}$, which is 1V. Thus, the output voltage $V_{out}$ is generated at 5V. To generate an output voltage $V_{out}$ of 3.3V, the ratio of the resistor Rfb1 to the resistor Rfb2 is set to 2.3:1, and then the feedback voltage $V_{FB}$ is controlled to be equal to the reference voltage $V_{ref}$, which is 1V. Thus, the output voltage $V_{out}$ is generated at 3.3V.

That is, whether the output voltage $V_{out}$ is 5V or 3.3V, the feedback voltage $V_{FB}$ is equal to the reference voltage $V_{ref}$ of 1V. Thus, the voltage proportionate to the output voltage $V_{out}$ required for the adaptive on-time circuit 22 cannot be obtained from the feedback voltage $V_{FB}$. Accordingly, the inventor of the present invention considers that it is desirable to provide the simulated voltage generation circuit for smoothing the voltage VL at the node N1 as in the embodiment.

Figure 5:
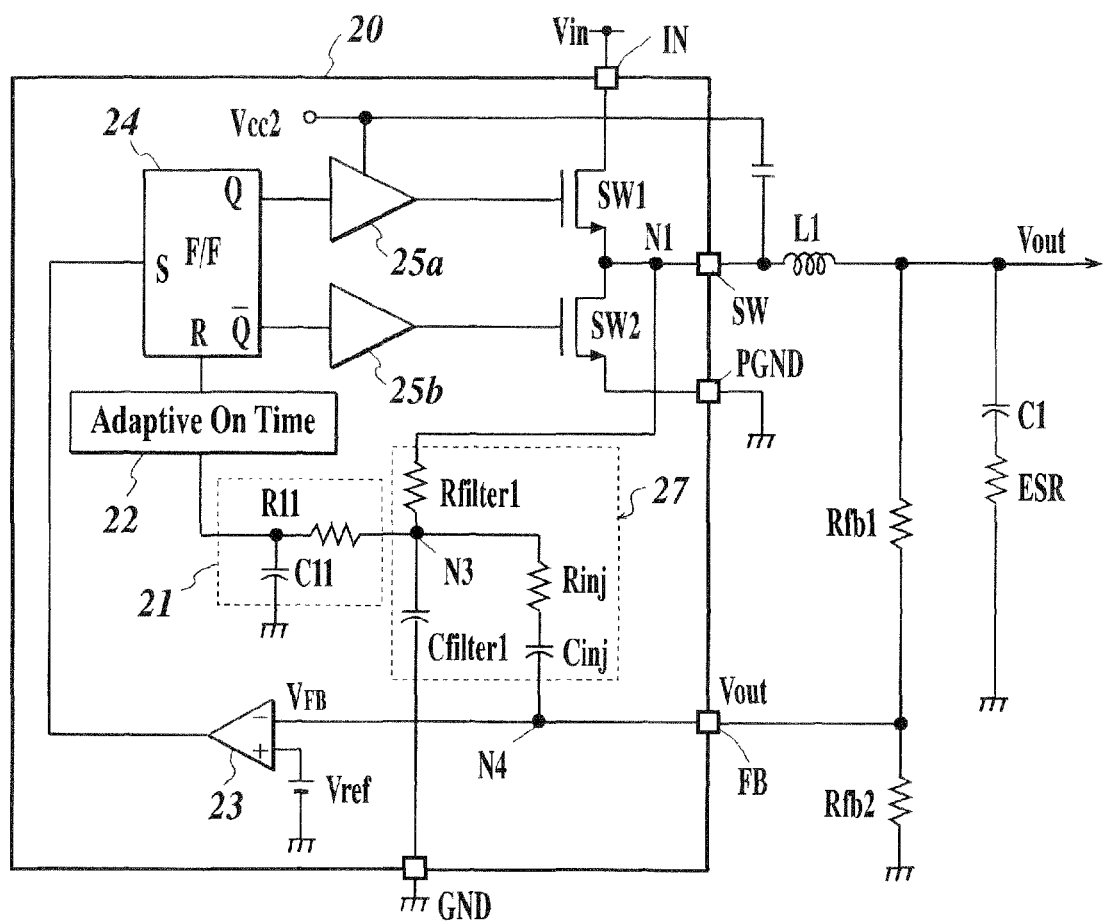
FIG. 5 is a circuit configuration diagram illustrating a switching control circuit according to an alternative example of the embodiment in FIG. 1.

FIG. 5 illustrates a switching control circuit (IC) 20 according to a second example of the embodiment in FIG. 1. In this example, a ripple injection circuit 27, which is connected between the node N1 to which the coil L1 is connected and a node N4 at which the feedback voltage $V_{FB}$ is generated, adds a ripple component to the feedback voltage $V_{FB}$ based on the voltage at the node N1. In this example, the switching elements SW1 and SW2 are composed of an on-chip MOS transistor (N channel).

This example is effective for a ceramic smoothing capacitor C1 having a small ESR (equivalent series resistance). Using such a capacitor reduces ripple of the output voltage $V_{out}$, making ripple control difficult. Thus, the ripple injection circuit 27 is provided in this example. The switching elements SW1 and SW2 may be external elements.

Figure 6:
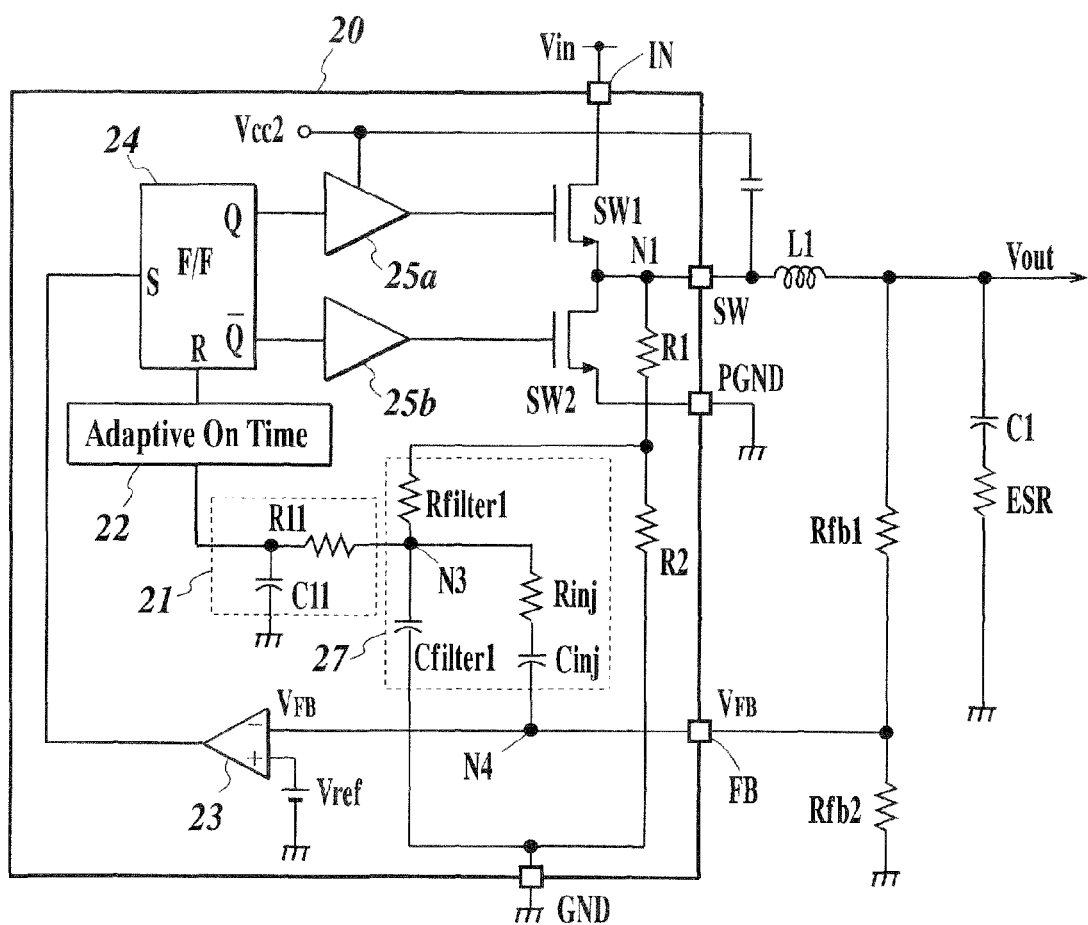
FIG. 6 is a circuit configuration diagram illustrating a modification of the switching control circuit according to the alternative example in FIG. 5.

FIG. 6 illustrates a modification of the switching control circuit 20 in FIG. 5. The ripple injection circuit 27 is provided, similar to FIG. 5. In addition, series resistors R1 and R2 that divide the voltage at the node N1 are provided such that a voltage divided at the resistors is input to the ripple injection circuit 27.

The present invention has been described in detail based on the embodiment. The present invention, however, is not limited to the embodiment. In the embodiment, for example, the circuit is provided to monitor the voltage of the terminal (node N1) to which the coil is connected and to generate a voltage corresponding to the output voltage in a simulated manner. Alternatively, the drive pulse that drives the gate of the switching element SW1 may be monitored to generate a voltage corresponding to the output voltage in a simulated manner.

In the embodiment, the DC-DC converter is described in which the switching elements SW1 and SW2 are connected as external elements of the switching control IC. Alternatively, the switching elements SW1 and SW2 may be on-chip elements. Furthermore, the switching element SW1 is an N-channel MOS transistor in the embodiment. Alternatively, the switching element SW1 may be a P-channel MOS transistor. Even in the case where the switching element SW1 is a P-channel MOS transistor, the adaptive on-time function can be mounted without an additional external terminal if the switching element SW1 is an on-chip element.

Furthermore, even in the case where the switching element SW1 is an external P-channel MOS transistor, the adaptive on-time function can be mounted without an additional external terminal by providing a circuit that monitors a drive pulse and generates a voltage corresponding to an output voltage in a simulated manner if, for example, an input voltage $V_{in}$ or a voltage proportionate thereto is used as the power voltage of the driver that drives the gate of the switching element SW1.

In the embodiment, the simulated voltage generation circuit 21 is a low pass filter composed of a resistor and a capacitor. The resistor may be replaced with a filter composed of an inductor formed of a wiring pattern.

Furthermore, the switching element SW2 composed of a MOS transistor is used as the low-side rectifying element connected between the start point of the coil L1 and the ground point in the embodiment. A DC-DC converter that includes a diode instead of the switching element SW2 may be used and the present invention can be applied thereto.

According to an aspect of the preferred embodiments of the present invention, there is provided a switched-mode power supply that outputs a voltage different from an input voltage, the switched-mode power supply including: an inductor connected between a voltage input terminal to which a DC voltage is input and an output terminal to which a load is connected; a drive switching element that causes a current to intermittently flow through the inductor; and a control circuit that is provided on a semiconductor chip as a semiconductor integrated circuit and that generates a drive pulse in response to the voltage input to the voltage input terminal and a feedback voltage from the output terminal to switch on/off the drive switching element, wherein the control circuit includes: a simulated voltage generation circuit that smoothes a voltage at a node connecting the drive switching element and the inductor and that generates and outputs a simulated voltage corresponding to the output voltage; a timer that measures a time corresponding to the input voltage and the simulated voltage; a voltage comparison circuit that compares the feedback voltage and a predetermined voltage; and a control pulse generation circuit that generates a control pulse having a pulse width corresponding to the time measured by the timer based on output from the timer and output from the voltage comparison circuit, and wherein the control circuit varies the pulse width of the control pulse in accordance with a variation in the input voltage and the simulated voltage and outputs the drive pulse corresponding to the control pulse to maintain a constant switching cycle.

Accordingly, the control circuit provided as a semiconductor integrated circuit includes the simulated voltage generation circuit that smoothes the voltage at the node connecting the drive switching element and the inductor and that generates and outputs the simulated voltage corresponding to the output voltage; and the timer, which defines the pulse width of the control pulse, measures the time corresponding to the input voltage and the simulated voltage. Thus, an exclusive terminal is unnecessary to supply the output voltage to the timer, allowing an adaptive on-time function to be mounted on the control circuit (IC) without increasing the number of external terminals.

Preferably, the simulated voltage generation circuit includes: a voltage-dividing circuit that divides the voltage at the node connecting the drive switching element and the inductor; and a filter circuit that smoothes the voltage divided by the voltage-dividing circuit.

The simulated voltage generation circuit has the voltage-dividing circuit that divides the voltage at the node connecting the drive switching element and the inductor. Thus, an element having a low withstanding voltage and high capacity per unit area can be included in the filter circuit, reducing an area occupied by the circuit.

Preferably, the timer includes: a waveform generation circuit that generates a waveform signal having an inclination corresponding to the input voltage; and a voltage comparison circuit that compares the waveform signal generated in the waveform generation circuit with the simulated voltage, and wherein the filter circuit has a time constant to generate the simulated voltage that has an amplitude of $\frac{1}{100}$ or less of an amplitude of the waveform signal generated in the waveform generation circuit.

Thus, the switching frequency can be maintained constant unless the load varies.

Preferably, the control circuit has a soft-start function, and the time constant of the filter circuit is set such that a rising time of the simulated voltage is shorter than a rising time of the output voltage at start-up.

Thus, the adaptive on-time function is prevented from operating abnormally at start-up.

Preferably, the drive switching element is an N-channel MOS transistor, and the control circuit has an external terminal to which a source terminal of the MOS transistor and the inductor are connected.

Thus, whether the drive switching element is an external N-channel MOS transistor or an on-chip N-channel MOS transistor, the adaptive on-time function can be mounted on the control circuit provided as a semiconductor integrated circuit without increasing the number of external terminals.

The entire disclosure of Japanese Patent Application No. 2011-100911 filed on Apr. 28, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A switched-mode power supply that outputs a voltage different from an input voltage, the switched-mode power supply comprising:
    an inductor connected between a voltage input terminal to which a DC voltage is input and an output terminal to which a load is connected;
    a drive switching element that causes a current to intermittently flow through the inductor; and
    a control circuit that is provided on a semiconductor chip as a semiconductor integrated circuit and that generates a drive pulse in response to the voltage input to the voltage input terminal and a feedback voltage from the output terminal to switch on/off the drive switching element,
    wherein the control circuit comprises:
        a ripple injection circuit connected between a first node connecting the drive switching element and the inductor and a second node at which the feedback voltage is generated, the ripple injection circuit including (i) a first filter that includes a first resistor and a first capacitor connected in series between the first node and a ground point, and (ii) a second filter that includes a second resistor and a second capacitor connected in series between a third node, which is between the first resistor and the first capacitor, and the second node, wherein the ripple injection circuit adds a ripple component to the feedback voltage through the first filter and the second filter based on a voltage at the first node, and the ripple injection circuit adds the ripple directly to the second node at which the feedback voltage is generated;
        a simulated voltage generation circuit comprising a filter circuit that smoothes a voltage corresponding to the voltage at the first node, wherein the simulated voltage generation circuit receives a voltage at the third node and generates and outputs a simulated voltage corresponding to the output voltage, and wherein the voltage at the first node has a rectangular waveform with an amplitude corresponding to the voltage input to the voltage input terminal;
        a timer that receives the simulated voltage output from the simulated voltage generation circuit and measures a time corresponding to the input voltage and the simulated voltage;
        a voltage comparison circuit that compares the feedback voltage and a predetermined voltage;
        a control pulse generation circuit that generates a control pulse having a pulse width corresponding to the time measured by the timer based on output from the timer and output from the voltage comparison circuit; and
    wherein the control circuit varies the pulse width of the control pulse in accordance with a variation in the input voltage and the simulated voltage and outputs the drive pulse, corresponding to the control pulse, to maintain a constant switching cycle.

2. The switched-mode power supply according to claim 1, wherein the timer comprises:
    a waveform generation circuit that generates a waveform signal having an inclination corresponding to the input voltage; and
    a voltage comparison circuit that compares the waveform signal generated in the waveform generation circuit with the simulated voltage, and
    wherein the filter circuit has a time constant set such that the simulated voltage has an amplitude of $\frac{1}{100}$ or less of an amplitude of the waveform signal generated in the waveform generation circuit.

3. The switched-mode power supply according to claim 2, wherein:
    the control circuit has a soft-start function, and
    the time constant of the filter circuit is set such that a rising time of the simulated voltage is shorter than a rising time of the output voltage at start-up.

4. The switched-mode power supply according to claim 3, wherein:
    the drive switching element is an N-channel MOS transistor, and
    the control circuit has an external terminal to which a source terminal of the MOS transistor and the inductor are connected.

5. The switched-mode power supply according to claim 2, wherein:
    the drive switching element is an N-channel MOS transistor, and
    the control circuit has an external terminal to which a source terminal of the MOS transistor and the inductor are connected.

6. The switched-mode power supply according to claim 1, wherein:
the drive switching element is an N-channel MOS transistor, and
the control circuit has an external terminal to which a source terminal of the MOS transistor and the inductor are connected.

7. The switched-mode power supply according to claim 1, wherein the drive switching element is an on-chip N-channel MOS transistor.

8. The switched-mode power supply according to claim 1, wherein the drive switching element is an external element.

9. The switched-mode power supply according to claim 1, further comprising a voltage-dividing circuit including series resistors that divide the voltage at the first node, wherein a voltage divided with the series resistors of the voltage-dividing circuit is input to the ripple injection circuit.

10. The switched-mode power supply according to claim 9, wherein one end of the first resistor is directly connected to the voltage-dividing circuit, and the voltage-dividing circuit is directly connected to the voltage input via the drive switching element.

11. The switched-mode power supply according to claim 1, wherein one end of the first resistor is directly connected to the voltage input terminal via the drive switching element.

* * * * *